United States Patent
Hill et al.

[11] 3,799,632
[45] Mar. 26, 1974

[54] BEARINGS FOR RAILWAY VEHICLES

[75] Inventors: Joseph Henry Hill, Greenford;
Robert Edwin Walmsley, Marlow;
Derrick Douglas Parker,
Maidenhead, all of England

[73] Assignee: Vandorvell Products Limited,
Maidenhead, England

[22] Filed: Sept. 5, 1972

[21] Appl. No.: 286,106

[30] Foreign Application Priority Data
Sept. 9, 1971  Great Britain............... 42199/71

[52] U.S. Cl. .............................................. 308/56
[51] Int. Cl. ......................................... F16c 33/04
[58] Field of Search..................... 308/53, 54, 57

[56] References Cited
UNITED STATES PATENTS
2,587,088  2/1952  Augereau........................ 308/53

FOREIGN PATENTS OR APPLICATIONS
126,650  4/1920  Great Britain................ 308/56
885,791  11/1953  Germany..................... 308/53

Primary Examiner—Charles J. Myhre
Assistant Examiner—Frank Susko
Attorney, Agent, or Firm—Mawhinney & Mawhinney

[57] ABSTRACT

A railway bearing consisting of an aluminium alloy bearing block having a part-cylindrical recess in which two flexible bearing liners are seated. The liners have pre-formed bearing surfaces and are pressed against the surface of the recess to ensure good heat transfer from the liners to the block.

7 Claims, 3 Drawing Figures

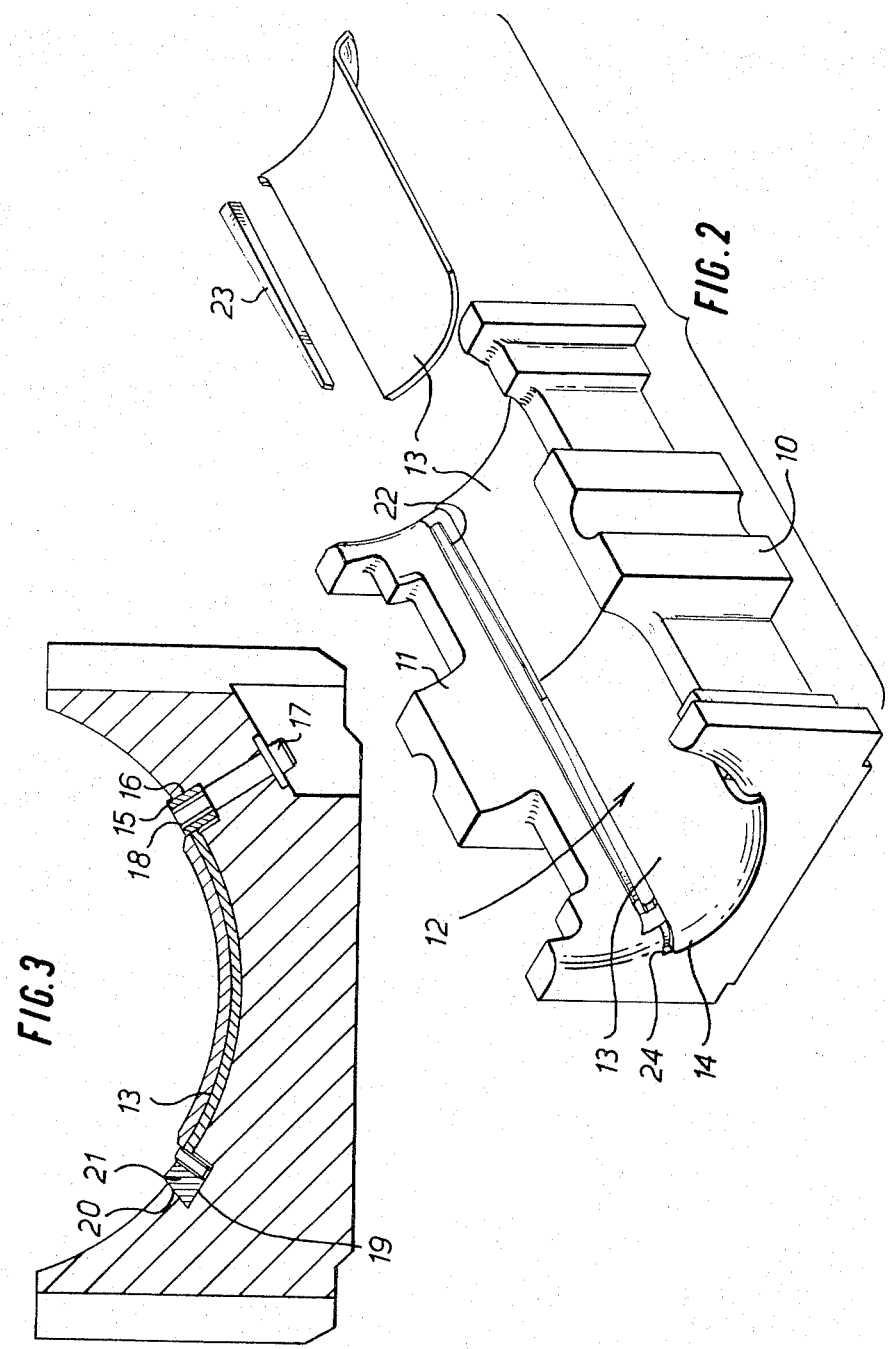

BEARINGS FOR RAILWAY VEHICLES

BACKGROUND OF THE INVENTION

1. Field of the Invention

This invention relates to bearings for railway vehicles.

2. Description of the Prior Art

Hitherto two forms of bearings for railway vehicles have been commonly used. The first of these comprises a bronze block having a part-cylindrical recess into which a bearing layer of tin-based or lead-based babbit is cast. Such bearings require to be run in with a light load and if a bearing failure occurs in use the block must be replaced and the vehicle run unloaded until the new bearing has been run in. This usually requires the vehicle to be unloaded and removed from its train. Further if the failure of the bearing is undetected, damage to the axle may occur. Furthermore the bronze blocks have a high scrap value which results in the theft of blocks from railway vehicles.

The second of the commonly used forms of bearing is a roller bearing and whilst such bearings fail less frequently than the above described bearing their cost is considerably greater.

Further constructions of bearings for railway vehicles have been proposed. For example U.K. Pat. Specification No. 567,185 discloses a bearing comprising a cast iron bearing block having a part-cylindrical recess in which a bearing liner is seated. Since the liner merely rests against the recess in the block and the block is formed from cast iron which has a relatively low thermal conductivity, in certain circumstances overheating of the bearing leading to bearing failure is likely to occur due to inadequate heat flow from the bearing. Further since cast iron is a poor bearing material, if the bearing fails and the axle comes into engagement with block damage to the axle is likely to occur.

There is a further proposed construction in U.K. Pat. Specification No. 604,196 in which a bearing for a railway vehicle axle is described comprising a block having a part-cylindrical recess in which a bearing liner is held in place by a key. The specification is primarily concerned with the need to cater for differing axle diameters and it is proposed to insert a shim between the liner and recess to reduce the curvature of the liner for smaller axles. The bearing surface of the liner is used in an "as cast" condition and so would require running in under a light load. Further no consideration is given to the problem of ensuring adequate heat flow through the block to prevent overheating of the bearing or the problem of preventing damage to the axle should the bearing fail and the axle run in engagement with the block.

The objects of the present invention are to overcome the disadvantages of the previous constructions as outlined above.

SUMMARY OF THE INVENTION

The invention provides a bearing for a railway vehicle comprising a bearing block having a part-cylindrical recess and a bearing liner forced into engagement with the surface of the recess by at least one key engaging an axially extending edge of the liner, characterised in that the block is formed from an aluminium alloy of high thermal conductivity and in that the liner has a preformed bearing surface to receive a railway vehicle axle.

By forming the block from an aluminium alloy of high thermal conductivity good heat transmission from the bearing is ensured to prevent overheating of the bearing. Also aluminium alloys have reasonable bearing properties so that if the axle should engage the block in the event of a bearing failure damage to the shaft is not likely to occur.

Since the liners used have preformed bearing surfaces no running in is required and a new assembled bearing can therefore be used immediately with a loaded vehicle. Additionally only the liner need be replaced. Finally the scrap value of aluminium alloys is relatively low and so theft of the aluminium alloy blocks is unlikely to occur.

BRIEF DESCRIPTION OF THE DRAWINGS

FIG. 2 is a three-quarter perspective view of the bearing shown in FIG. 1, illustrating the method of assembly;

FIG. 3 is a cross-sectional view through the bearing of FIGS. 1 and 2.

DESCRIPTION OF THE PREFERRED EMBODIMENTS

Figure 1:
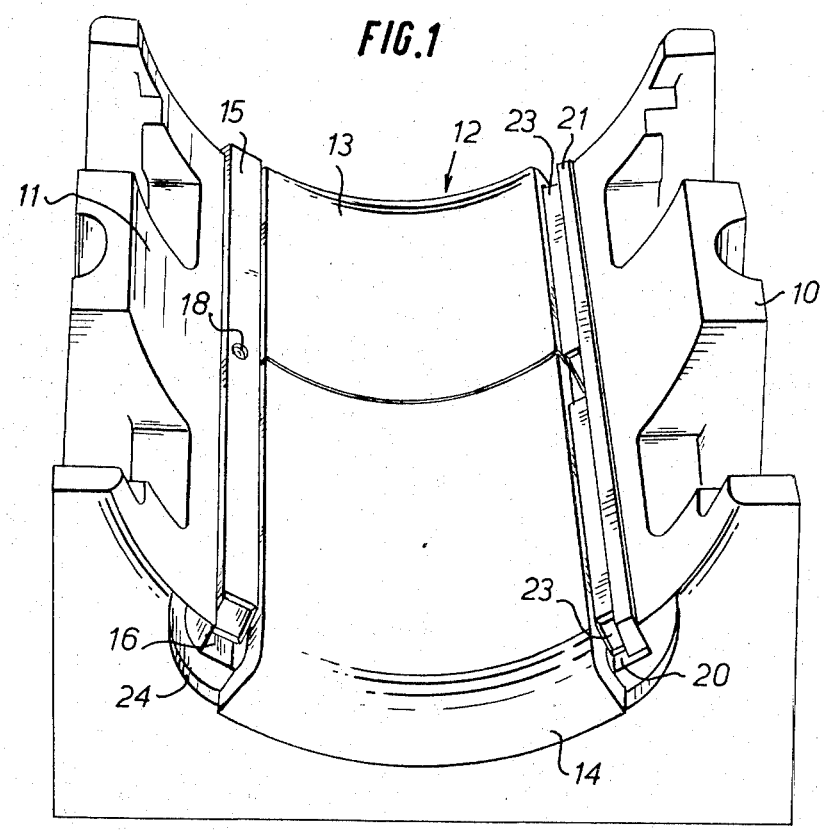
FIG. 1 is an end perspective view of one form of bearing for a railway vehicle axle.

Referring firstly to FIGS. 1 to 3 of the drawings, the bearing shown comprises a cast aluminium silicon bearing block 10 having a machined part cylindrical recess 11 extending along the length of one side of the block.

An arcuate flanged bearing liner indicated generally at 12 is seated in the recess 11. Liner 12 comprises two identical parts 13 each having an out-turned flange 14 at one end thereof which overlies an end face of the block 10. The length of the liner parts is such that there is a slight gap between the adjacent ends of the liner parts at the centre of the block. The circumferential length of each liner part is such that an angle of 65° is subtended at the axis of the liner part. The liner parts are formed from bi-metallic strip comprising a steel backing layer having a coating of lead based babbit.

One axially extending edge of each of the liners 13 engages a side face of an abutment member 15 which projects from a slot 16 extending axially along the recess 11 in the block 10. The abutment member 15 is held in the slot 16 by a single screw 17 extending from the under side of the block into a screw threaded bore 18 at the centre of the member 15. Adjacent the other axially extending edges of the liner parts 12 there is a slot 19 extending axially along the recess 11 in the block. The side of the slot remote from the liners 13 is undercut as indicated at 20. Slot 19 contains an abutment member 21 extending along the length thereof which has a part dove-tailed section to engage the undercut 20. The side of the member 21 adjacent the liner parts 13 has two wedge faces 22 which converge towards the liners towards the centre of the member. As best seen in FIG. 3 of the drawings, the circumferential length of the liner parts 13 is slightly greater than the distance between the adjacent sides of the slots 16, 19 so that the liner parts 13 overhang the slots 19 slightly. Two tapered keys 23 of similar length to the liner parts and formed in aluminium silicon alloy are driven into opposite ends of the slot 19 between the wedge surfaces 22 and the overhanging axial extending edges of the liner parts 13. A force of 300 lb is applied to the keys to drive the keys between the liner edges and wedge surfaces 22 to compress the liner circumferentially and force the liner into intimate contact with the surface of the recess to ensure good heat transmission between the liner and block. The liner parts 13 are thus firmly held between the keys 23 and the abutment 15 and the outer faces of the liner parts are pressed into intimate engagement with the surface of the recess 11 in the block. This ensures good heat transfer between the liner and the block. The taper of the keys 23 and the angle of the wedge surface 22 is sufficiently shallow that the keys remain in situ when driven into place and do not tend to work out. Since the abutment member 21 has a dove-tail section which engages in an undercut 20 in the side of the recess 19, once the keys 23 have been driven into place the abutment member cannot move radially outwardly of the slot.

As indicated earlier the liner parts 12 are formed from bi-metallic strip comprising a steel backing and a layer of lead based babbit. Both the keys 23 and the abutment 15 are formed from aluminium silicon alloy having good bearing properties and project above the level of the steel backing layer of the liner parts whilst stopping short of the upper surface of the bearing layer. Thus if the babbit is worn away the keys 23 and abutment 15 are engaged first before the steel back of the liner.

As indicated earlier the liner parts 13 have out-turned flanges 14 at the ends of the block 10. The end faces of the block are recessed as indicated at 24 to partly receive the flanges 14. The depth of the recesses 24 is such that the inter face between the babbit and the steel backing of the flange 14 is located below the end surface of the block. Thus if the babbit on the flange 14 is worn away the end face of the aluminium silicon block is engaged rather than the steel backing of the flange 14.

As indicated above the block 10 is formed from an aluminium silicon alloy which is both a good bearing materialand and has a high thermal conductivity. It is preferred that the thermal conductivity of the alloy is at least 0.20 calories /second/centimetre cube/ degree centigrade to ensure good dissipation of heat from the bearing liner. Three suitable alloys are LM27, LM24 and LM6, some constituents and properties of these alloys are as follows:

|  | LM24 | LM27 | LM6 |
|---|---|---|---|
| Cu | 3 - 4 | 1.5/2.5 | .1 |
| Mg | 0.1 | 0.3 | .1 |
| Si | 7.5/9.5 | 6/8 | 10/13 |
| Fe | 1.3 | 0.8 max | 0.6 |
| Mn | 0.5 | 0.2/.6 | 0.5 |
| Ni | 0.5 | 0.3 | 0.1 |
| Zn | 3.0 | 1.0 | 0.1 |
| Pb | 0.3 | 0.2 | 0.1 |
| Sn | 0.2 | 0.1 | 0.05 |
| Ti | 0.2 | 0.2 | 0.2 |
| Al | Balance | Balance | Balance |
| Thermal conductivity | 0.23 cgs | 0.36 cgs | 0.34 cgs |

Of the alloys listed above, LM27 has the highest thermal conductivity and this is the preferred alloy for the block. The key 23 and abutment member 15 may be formed in the same or a similar alloy.

In use, the above described bearing is mounted in an axle box of a railway vehicle with the liner 12 facing downwardly to receive the axle. The radius of the inner surface of the liner is made slightly greater than the radius of the shaft which is to mate with the liner when the shaft is unworn. By way of example in the case of a 4.5 inch. diameter shaft, the radius of the liner may be 40 thousandths of an inch greater than the radius of the unworn axle. The internal surface of each liner may be machined or formed to the required finish and contour by coin pressing.

In one variation of the above construction the curvature of the internal surface of the liner may vary from a maximum at the centre of the liner to a minimum at the circumferential edges so that a pocket is formed with the shaft at the centre of the liner to retain lubricant. In a further variation the internal surface of the liner may be spaced indentations or serrations to trap lubricant or to assist in running in by allowing the bearing to conform quickly to the shaft.

Aluminium silicon alloys as set out above are super plastic in a temperature range of the order of 200°C–300°and so the block 10 can conveniently be formed by backward extrusion of a slug of the aluminium silicon alloy at a temperature at which the alloy is super plastic in a pair of appropriately shaped dies followed by machining operations after the block has cooled.

We claim:

1. A bearing for a railway vehicle comprising a bearing block having a part-cylindrical recess and a bearing liner forced into engagement with the surface of the recess by at least one key engaging an axially extending edge of the liner, characterized in that the block is formed from an aluminium silicon alloy of thermal conductivity of at least 0.23 (c.g.s. units) and in that the liner has a preformed bearing surface to receive a railway vehicle axle.

2. A bearing as claimed in claim 1 wherein the aluminium-silicon alloy contains 7.5 to 13 percent by weight of silicon.

3. A bearing as claimed in claim 2 wherein the composition of the aluminium-silicon alloy is 12 percent silicon, 1 percent copper; 1 percent nickel; 1 percent manganese and the remainder aluminium.

4. A bearing as claimed in claim 1 wherein the bearing liner comprises a steel back having a coating of bearing material.

5. A bearing as claimed in claim 4 wherein the bearing material is babbit.

6. A bearing as claimed in claim 1 wherein the bearing liner has out-turned flanges at the axial ends thereof which abut side faces of the block.

7. A bearing as claimed in claim 1 wherein the bearing liner has out-turned flanges at the axial ends thereof which abut side faces of the block and the bearing liner comprises two parts located end to end in the recess with a slight gap between adjacent ends thereof.

* * * * *

UNITED STATES PATENT OFFICE
CERTIFICATE OF CORRECTION

Patent No. 3,799,632          Dated March 26, 1974

Inventor(s) Joseph Henry Hill, Robert Edwin Walmsley & Derrick Douglas Parker

It is certified that error appears in the above-identified patent and that said Letters Patent are hereby corrected as shown below:

In the Heading of the Patent the first part of the name of the Assignee "Vandorvell" should read --Vandervell--.

Signed and sealed this 3rd day of June 1975.

(SEAL)
Attest:

RUTH C. MASON
Attesting Officer

C. MARSHALL DANN
Commissioner of Patents
and Trademarks